(12) United States Patent
Murad et al.

(10) Patent No.: US 11,117,594 B2
(45) Date of Patent: Sep. 14, 2021

(54) SYSTEM AND METHOD FOR DETECTING OBJECTS IN AN AUTONOMOUS VEHICLE

(71) Applicant: GM GLOBAL TECHNOLOGY OPERATIONS LLC, Detroit, MI (US)

(72) Inventors: Mohannad Murad, Troy, MI (US); Eric Hatfield, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 351 days.

(21) Appl. No.: 16/015,330

(22) Filed: Jun. 22, 2018

(65) Prior Publication Data

US 2019/0389486 A1 Dec. 26, 2019

(51) Int. Cl.
*B60W 50/14* (2020.01)
*G01V 8/10* (2006.01)
*B60W 30/18* (2012.01)
*G06K 9/00* (2006.01)

(52) U.S. Cl.
CPC ............ *B60W 50/14* (2013.01); *B60W 30/18* (2013.01); *G01V 8/10* (2013.01); *G06K 9/00832* (2013.01); *B60W 2050/143* (2013.01); *B60W 2710/18* (2013.01); *B60W 2710/20* (2013.01); *B60W 2710/305* (2013.01); *B60W 2720/106* (2013.01)

(58) Field of Classification Search
CPC .................................................. B60W 50/14
See application file for complete search history.

(56) References Cited

U.S. PATENT DOCUMENTS

| | | | | |
|---|---|---|---|---|
| 6,735,506 B2* | 5/2004 | Breed | ................ | B60C 23/0408 701/36 |
| 6,778,672 B2* | 8/2004 | Breed | ............... | B60R 21/01552 381/86 |
| 6,820,897 B2* | 11/2004 | Breed | ................... | B60R 21/015 280/735 |
| 6,856,873 B2* | 2/2005 | Breed | .................... | B60N 2/002 180/271 |
| 6,869,100 B2* | 3/2005 | Breed | .................... | B60N 2/002 280/735 |
| 6,910,711 B1* | 6/2005 | Breed | .................... | B60N 2/002 280/735 |
| 6,919,803 B2* | 7/2005 | Breed | ................. | G06Q 20/203 340/426.19 |
| 6,942,248 B2* | 9/2005 | Breed | .................... | B60N 2/853 280/735 |

(Continued)

*Primary Examiner* — Michael A Berns

(57) ABSTRACT

An automotive vehicle includes a cabin, an optical sensor arranged to capture images of the cabin, a light control system operable to modify an intensity or direction of incident light in the cabin, and a controller. The controller is configured to automatically, in response to an object detection request, control the optical sensor to capture a first image of the cabin with a first incident light configuration, control the light control system to modify an intensity or direction of incident light in the cabin to a second incident light configuration, control the optical sensor to capture a second image of the cabin with the second incident light configuration, detect a change in a shadow between the first image and the second image, infer the presence of an object in the cabin based on the change in shadow, and perform a corrective action based on the presence of the object.

13 Claims, 5 Drawing Sheets

(56) References Cited

U.S. PATENT DOCUMENTS

| | | | | |
|---|---|---|---|---|
| 6,950,022 B2* | 9/2005 | Breed | ............... | B60N 2/829 |
| | | | | 340/552 |
| 7,050,897 B2* | 5/2006 | Breed | ............... | B60C 11/24 |
| | | | | 701/46 |
| 7,164,117 B2* | 1/2007 | Breed | ............... | B60R 21/01516 |
| | | | | 250/208.1 |
| 7,386,372 B2* | 6/2008 | Breed | ............... | B60R 21/01536 |
| | | | | 340/436 |
| 7,415,126 B2* | 8/2008 | Breed | ............... | B60J 10/00 |
| | | | | 382/100 |
| 7,596,242 B2* | 9/2009 | Breed | ............... | G06K 9/00362 |
| | | | | 382/103 |
| 7,663,502 B2* | 2/2010 | Breed | ............... | G01S 17/04 |
| | | | | 340/12.25 |
| 7,738,678 B2* | 6/2010 | Breed | ............... | B60R 21/01552 |
| | | | | 382/100 |
| 8,054,203 B2* | 11/2011 | Breed | ............... | G01S 15/87 |
| | | | | 340/931 |
| 8,948,442 B2* | 2/2015 | Breed | ............... | G06K 9/00832 |
| | | | | 382/100 |
| 9,290,146 B2* | 3/2016 | Breed | ............... | G06F 3/0233 |
| 9,454,154 B1* | 9/2016 | Safarik | ............... | H04N 5/247 |
| 9,953,283 B2* | 4/2018 | Sweeney | ............... | G05D 1/0027 |
| 2008/0142713 A1* | 6/2008 | Breed | ............... | B60R 21/01516 |
| | | | | 250/330 |
| 2009/0046538 A1* | 2/2009 | Breed | ............... | B60R 25/102 |
| | | | | 367/93 |
| 2019/0389486 A1* | 12/2019 | Murad | ............... | G01V 8/10 |

* cited by examiner

SYSTEM AND METHOD FOR DETECTING OBJECTS IN AN AUTONOMOUS VEHICLE

TECHNICAL FIELD

The present disclosure relates to vehicles controlled by automated driving systems, particularly those configured to automatically control vehicle steering, acceleration, and braking during a drive cycle without human intervention.

INTRODUCTION

The operation of modern vehicles is becoming more automated, i.e. able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

An automotive vehicle according to the present disclosure includes a cabin, an optical sensor arranged to capture images of the cabin, a light control system operable to modify an intensity or direction of incident light in the cabin, and a controller. The controller is configured to automatically, in response to an object detection request, control the optical sensor to capture a first image of the cabin with a first incident light configuration, control the light control system to modify an intensity or direction of incident light in the cabin to a second incident light configuration, control the optical sensor to capture a second image of the cabin with the second incident light configuration, detect a change in a shadow between the first image and the second image, infer the presence of an object in the cabin based on the change in shadow, and perform a corrective action based on the presence of the object.

In an exemplary embodiment, the light control system comprises an interior light disposed in the cabin, and the controller is configured to control the light control system by selectively turning the interior light on or off.

In an exemplary embodiment, the cabin is provided with at least one window, the light control system comprises a window shade having an open position and a closed position, and the controller is configured to control the light control system by selectively moving the window shade between the open position and the closed position.

In an exemplary embodiment, the light control system comprises at least one actuator configured to control vehicle steering, acceleration, or braking, and the controller is configured to control the light control system by selectively controlling the actuator to move the vehicle between a first orientation with respect to an ambient light source and a second orientation with respect to an ambient light source.

In an exemplary embodiment, the object detection request is based on an image difference between a reference cabin image captured before a drive cycle and a final cabin image captured after a drive cycle.

In an exemplary embodiment, the corrective action comprises signaling an alert to a user.

A method of detecting an object according to the present disclosure includes providing a detection space with an optical sensor arranged to capture images of the detection space, a light control system operable to modify an intensity or direction of incident light in the detection space, and at least one controller in communication with the optical sensor and the light control system. The method also includes automatically controlling the optical sensor, via the at least one controller, to capture a first image of the detection space with a first incident light configuration. The method additionally includes automatically controlling the light control system, via the at least one controller, to modify an intensity or direction of incident light in the cabin to a second incident light configuration, distinct from the first incident light configuration. The method further includes automatically controlling the optical sensor, via the at least one controller, to capture a second image of the detection space with the second incident light configuration, automatically detecting a change in a shadow between the first image and the second image via the at least one controller, and automatically signaling an alert, via the at least one controller, based on the detected change in shadow.

In an exemplary embodiment, the detection space is provided with at least one window, the light control system comprises a window system operable to modify incident light through the window, and automatically controlling the light control system comprises controlling the window system to modify incident light.

In an exemplary embodiment, automatically detecting a change in shadow comprises performing an image difference algorithm on the first image and the second image.

In an exemplary embodiment, the light control system comprises an interior light disposed in the detection space, and automatically controlling the light control system comprises selectively turning the interior light on or off.

In an exemplary embodiment, the detection space comprises a cabin of an automotive vehicle. In such embodiments, the light control system may comprise at least one actuator configured to control vehicle steering, acceleration, or braking, and automatically controlling the light control system may comprise selectively controlling the actuator to move the vehicle between a first orientation with respect to an ambient light source and a second orientation with respect to the ambient light source.

A detection system for an automotive vehicle according to the present disclosure includes an optical sensor arranged to capture images of a portion of the vehicle, a light control system operable to modify an intensity or direction of incident light on the portion of the vehicle, and a controller. The controller is configured to control the optical sensor to capture a reference image of the portion of the vehicle prior to a drive cycle, control the optical sensor to capture a first image of the portion of the vehicle subsequent the drive cycle, control the light control system to modify an intensity or direction of incident light in the cabin to a second incident light configuration in response to the first image differing from the reference image, control the optical sensor to capture a second image of the cabin with the second incident light configuration, and automatically signal an alert in response to the second image differing from the first image.

Embodiments according to the present disclosure provide a number of advantages. For example, the present disclosure provides a system and method for automatically determining that an object has been left behind in a vehicle, and for taking corrective action when such a determination is made.

The above and other advantages and features of the present disclosure will be apparent from the following detailed description of the preferred embodiments when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but are merely representative. The various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
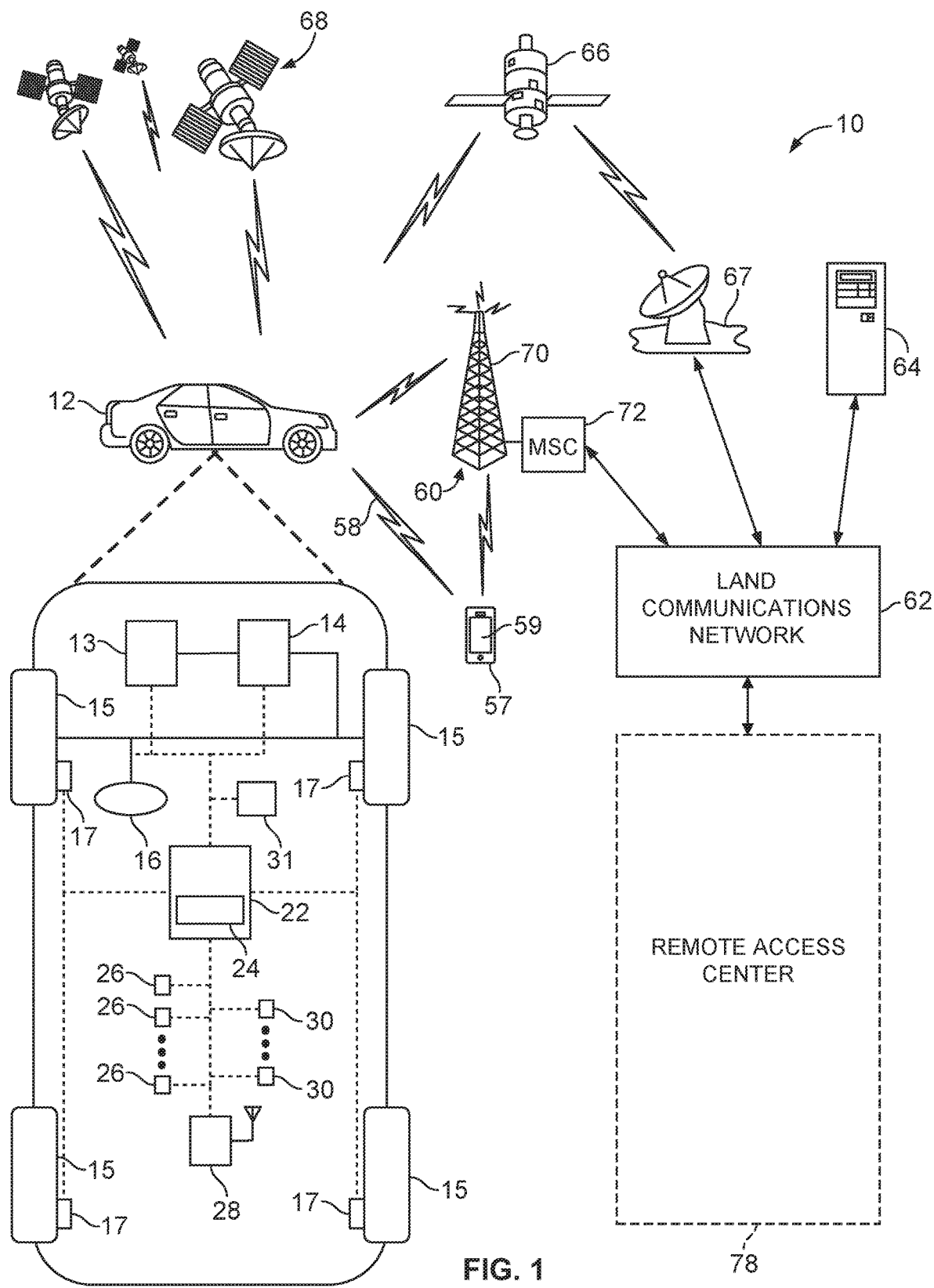
FIG. 1 is a schematic diagram of a communication system including an autonomously controlled vehicle according to an embodiment of the present disclosure.

FIG. 1 schematically illustrates an operating environment that comprises a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, which may in various embodiments include an internal combustion engine, an electric machine such as a traction motor, and/or a fuel cell propulsion system.

The vehicle 12 also includes a transmission 14 configured to transmit power from the propulsion system 13 to a plurality of vehicle wheels 15 according to selectable speed ratios. According to various embodiments, the transmission 14 may include a step-ratio automatic transmission, a continuously-variable transmission, or other appropriate transmission. The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes a steering system 16. While depicted as including a steering wheel for illustrative purposes, in some embodiments contemplated within the scope of the present disclosure, the steering system 16 may not include a steering wheel.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Three automation system. A Level Three system indicates "Conditional Automation", referring to the driving mode-specific performance by an automated driving system of all aspects of the dynamic driving task with the expectation that the human driver will respond appropriately to a request to intervene.

Other embodiments according to the present disclosure may be implemented in conjunction with so-called Level One or Level Two automation systems. A Level One system indicates "driver assistance", referring to the driving mode-specific execution by a driver assistance system of either steering or acceleration using information about the driving environment and with the expectation that the human driver perform all remaining aspects of the dynamic driving task. A Level Two system indicates "Partial Automation", referring to the driving mode-specific execution by one or more driver assistance systems of both steering and acceleration using information about the driving environment and with the expectation that the human driver perform all remaining aspects of the dynamic driving task.

Still other embodiments according to the present disclosure may also be implemented in conjunction with so-called Level Four or Level Five automation systems. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62, but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
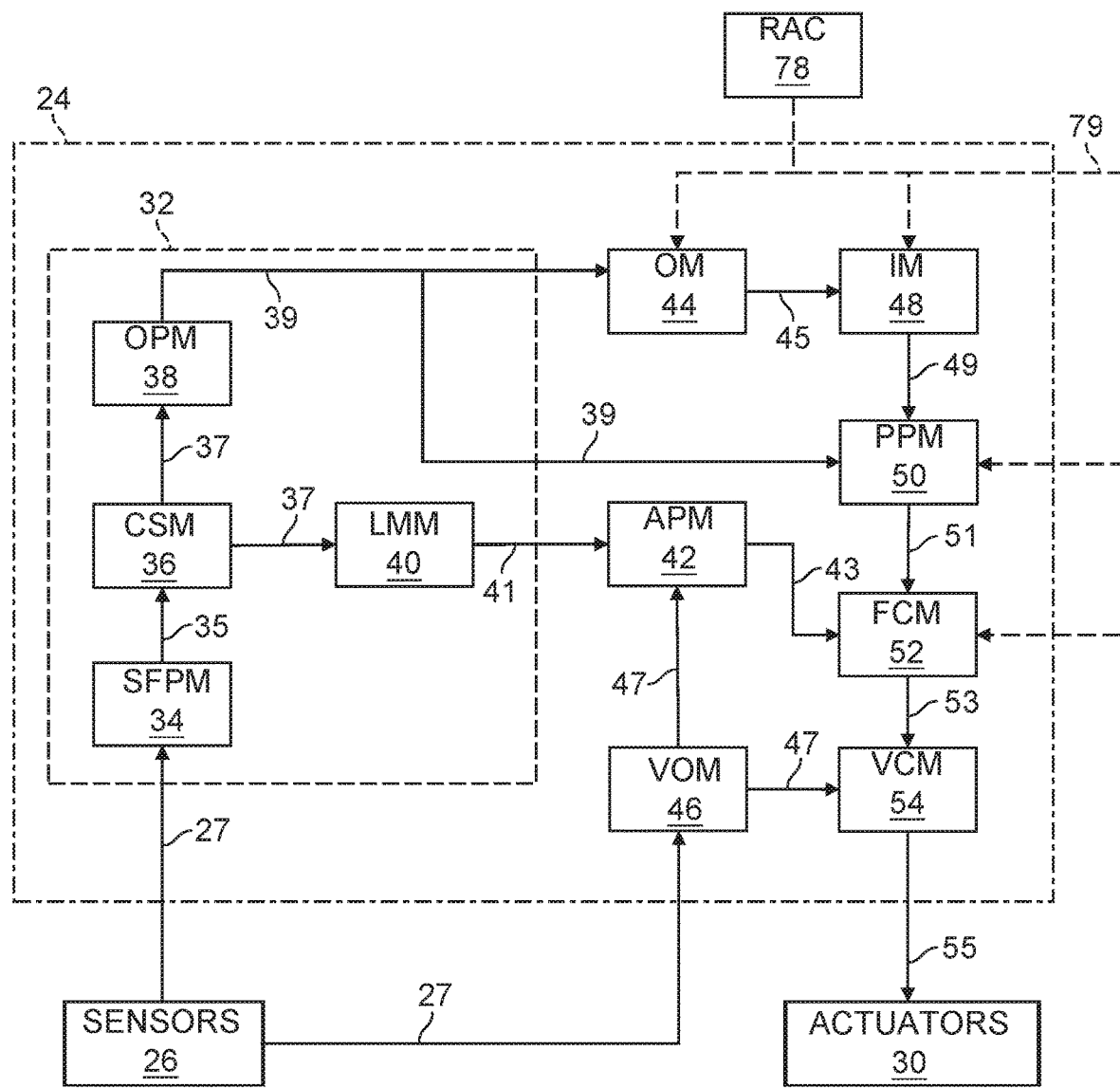
FIG. 2 is a schematic block diagram of an automated driving system (ADS) for a vehicle according to an embodiment of the present disclosure.
Figure 3:
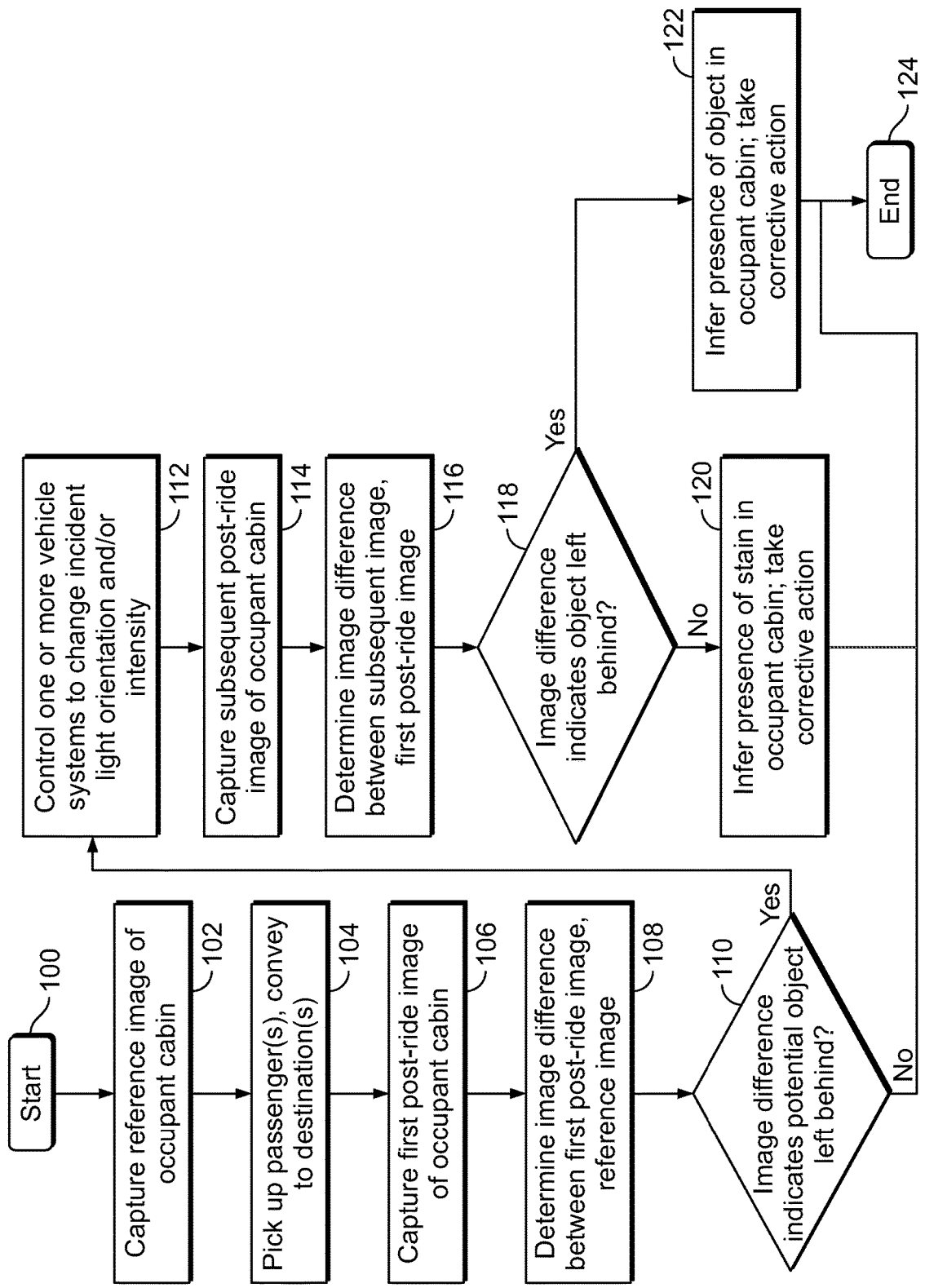
FIG. 3 is a flowchart representation of a method of controlling a vehicle according to an embodiment of the present disclosure.

As shown in FIG. 2, the ADS 24 includes multiple distinct control systems, including at least a perception system 32 for determining the presence, location, classification, and path of detected features or objects in the vicinity of the vehicle. The perception system 32 is configured to receive inputs from a variety of sensors, such as the sensors 26 illustrated in FIG. 1, and synthesize and process the sensor inputs to generate parameters used as inputs for other control algorithms of the ADS 24.

The perception system 32 includes a sensor fusion and preprocessing module 34 that processes and synthesizes sensor data 27 from the variety of sensors 26. The sensor fusion and preprocessing module 34 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 34 outputs preprocessed sensor output 35.

A classification and segmentation module 36 receives the preprocessed sensor output 35 and performs object classification, image classification, traffic light classification, object segmentation, ground segmentation, and object tracking processes. Object classification includes, but is not limited to, identifying and classifying objects in the surrounding environment including identification and classification of traffic signals and signs, RADAR fusion and tracking to account for the sensor's placement and field of view (FOV), and false positive rejection via LIDAR fusion to eliminate the many false positives that exist in an urban environment, such as, for example, manhole covers, bridges, overhead trees or light poles, and other obstacles with a high RADAR cross section but which do not affect the ability of the vehicle to travel along its path. Additional object classification and tracking processes performed by the classification and segmentation model 36 include, but are not limited to, freespace detection and high level tracking that fuses data from RADAR tracks, LIDAR segmentation, LIDAR classification, image classification, object shape fit models, semantic information, motion prediction, raster maps, static obstacle maps, and other sources to produce high quality object tracks. The classification and segmentation module 36 additionally performs traffic control device classification and traffic control device fusion with lane association and traffic control device behavior models. The classification and segmentation module 36 generates an object classification and segmentation output 37 that includes object identification information.

A localization and mapping module 40 uses the object classification and segmentation output 37 to calculate parameters including, but not limited to, estimates of the position and orientation of vehicle 12 in both typical and challenging driving scenarios. These challenging driving scenarios include, but are not limited to, dynamic environments with many cars (e.g., dense traffic), environments with large scale obstructions (e.g., roadwork or construction sites), hills, multi-lane roads, single lane roads, a variety of road markings and buildings or lack thereof (e.g., residential vs. business districts), and bridges and overpasses (both above and below a current road segment of the vehicle).

The localization and mapping module 40 also incorporates new data collected as a result of expanded map areas obtained via onboard mapping functions performed by the vehicle 12 during operation and mapping data "pushed" to the vehicle 12 via the wireless communication system 28. The localization and mapping module 40 updates previous map data with the new information (e.g., new lane markings, new building structures, addition or removal of constructions zones, etc.) while leaving unaffected map regions unmodified. Examples of map data that may be generated or updated include, but are not limited to, yield line categorization, lane boundary generation, lane connection, classification of minor and major roads, classification of left and right turns, and intersection lane creation. The localization and mapping module 40 generates a localization and mapping output 41 that includes the position and orientation of the vehicle 12 with respect to detected obstacles and road features.

A vehicle odometry module 46 receives data 27 from the vehicle sensors 26 and generates a vehicle odometry output 47 which includes, for example, vehicle heading and velocity information. An absolute positioning module 42 receives the localization and mapping output 41 and the vehicle odometry information 47 and generates a vehicle location output 43 that is used in separate calculations as discussed below.

An object prediction module 38 uses the object classification and segmentation output 37 to generate parameters including, but not limited to, a location of a detected obstacle relative to the vehicle, a predicted path of the detected obstacle relative to the vehicle, and a location and orientation of traffic lanes relative to the vehicle. Data on the predicted path of objects (including pedestrians, surrounding vehicles, and other moving objects) is output as an object prediction output 39 and is used in separate calculations as discussed below.

The ADS 24 also includes an observation module 44 and an interpretation module 48. The observation module 44 generates an observation output 45 received by the interpretation module 48. The observation module 44 and the interpretation module 48 allow access by the remote access center 78. The interpretation module 48 generates an interpreted output 49 that includes additional input provided by the remote access center 78, if any.

A path planning module 50 processes and synthesizes the object prediction output 39, the interpreted output 49, and additional routing information 79 received from an online database or the remote access center 78 to determine a vehicle path to be followed to maintain the vehicle on the desired route while obeying traffic laws and avoiding any detected obstacles. The path planning module 50 employs algorithms configured to avoid any detected obstacles in the vicinity of the vehicle, maintain the vehicle in a current traffic lane, and maintain the vehicle on the desired route. The path planning module 50 outputs the vehicle path information as path planning output 51. The path planning output 51 includes a commanded vehicle path based on the vehicle route, vehicle location relative to the route, location and orientation of traffic lanes, and the presence and path of any detected obstacles.

A first control module 52 processes and synthesizes the path planning output 51 and the vehicle location output 43 to generate a first control output 53. The first control module 52 also incorporates the routing information 79 provided by the remote access center 78 in the case of a remote take-over mode of operation of the vehicle.

A vehicle control module 54 receives the first control output 53 as well as velocity and heading information 47 received from vehicle odometry 46 and generates vehicle control output 55. The vehicle control output 55 includes a set of actuator commands to achieve the commanded path from the vehicle control module 54, including, but not limited to, a steering command, a shift command, a throttle command, and a brake command.

The vehicle control output 55 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

In an autonomous vehicle, and particularly in an autonomous vehicle which may be shared by a plurality of passengers, it may be difficult to determine whether an object has been left behind by a passenger. Whereas in conventional human-driven vehicles, a driver may inspect the cabin to ensure that no objects have been forgotten, autonomous vehicles may not have a human driver.

Referring now to FIGS. 3 and 4A-4D, a method of controlling a vehicle according to the present disclosure is illustrated. The method begins at block 100 in FIG. 3.

Figure 4A:
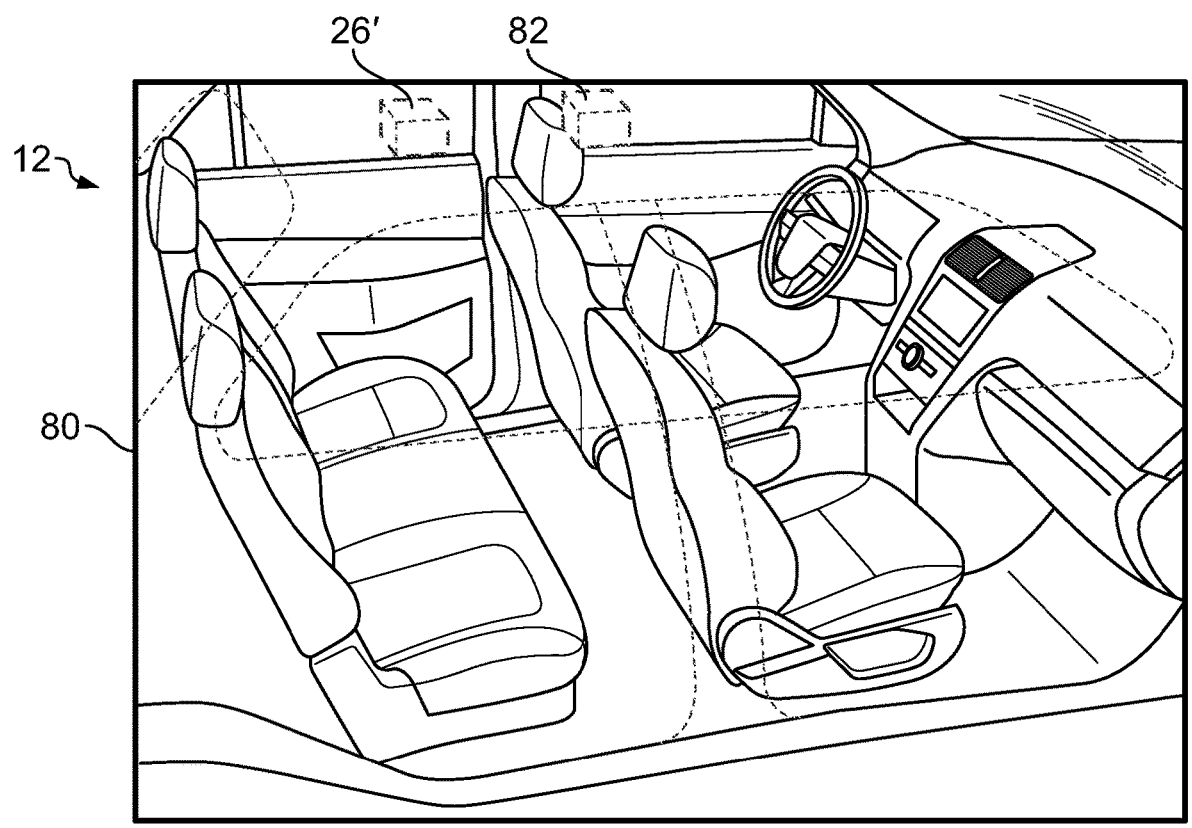
FIGS. 4A-4D are representations of images of a vehicle cabin according to an embodiment of the present disclosure.
Figure 4B:
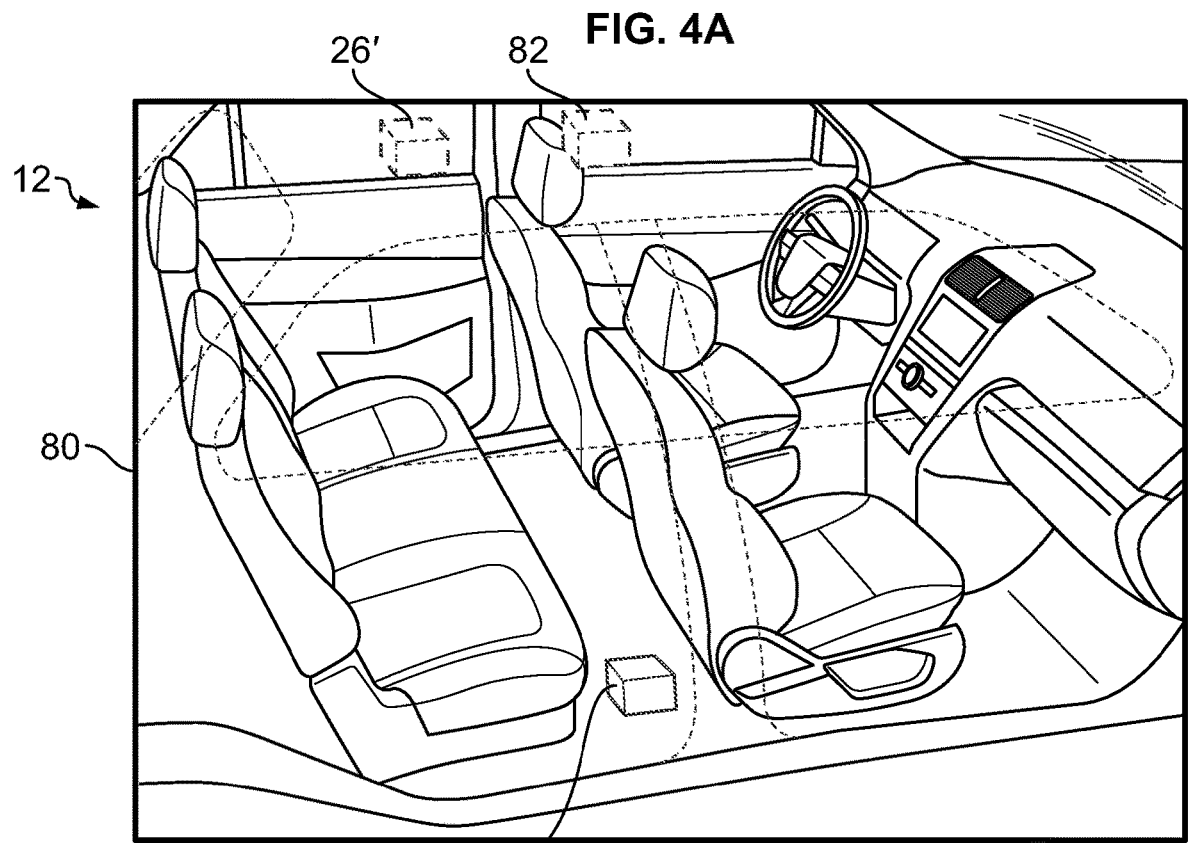
Figure 4C:
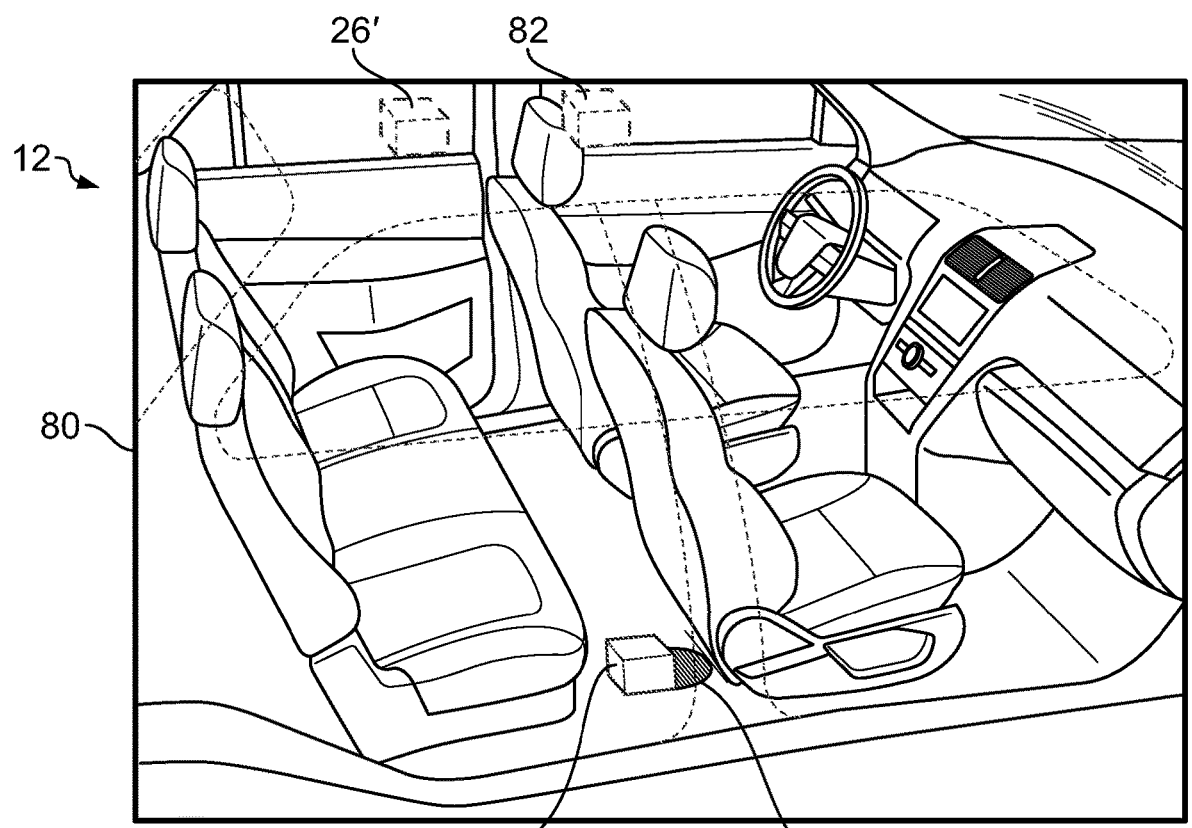

A reference image of an occupant cabin is captured, as illustrated at block 102. The reference image refers to an image of the interior of the vehicle which is captured before initiating a drive cycle, e.g. with no occupants in the cabin. An illustrative occupant cabin 80 of the vehicle 12' is illustrated in FIG. 4A. Among the sensors 26 is one or more optical cameras 26' arranged to capture images of the occupant cabin 80. In an exemplary embodiment, the reference image may be captured by the optical camera 26' based on a command from the controller 22. The command may be generated, for example, based on a determination that no occupants are currently in the vehicle 12.

The occupant cabin 80 is additionally provided with at least one light control system 82. The light control system 82 is in communication with or under control of the controller 22. The light control system 82 is operable to modify a light characteristic inside the vehicle, e.g. to modify an intensity or orientation of incident light in the occupant cabin 80. As used here, incident light refers to light falling on surfaces in the occupant from one or more interior or exterior light sources. In a first exemplary embodiment, the light control system 82 includes one or more interior lights disposed in the occupant cabin 80, e.g. a dome light. In a second exemplary embodiment, the light control system 82 includes one or more actuators, e.g. of the actuators 30, configured to selectively open or close shades associated with one or more vehicle windows or sunroofs. In a third exemplary embodiment, the light control system 82 includes one or more electrochromic windows configured to selectively increase opacity to decrease transmitted light from the exterior of the vehicle. Other embodiments may include other light control systems or any combination of the above.

In some embodiments, capturing the reference image of the occupant cabin may include controlling the light control system 82 to provide a predefined reference light setting prior to capturing the image, e.g. by closing all available window shades and turning on all interior lights of the occupant cabin 80.

Subsequent capturing the reference image, a drive cycle is performed, e.g. by picking up one or more passengers and conveying the passengers to their destinations, as illustrated at block 104. During such drive cycles, passengers may leave objects in the vehicle, e.g. the object 84 illustrated in FIG. 4B.

A first post-ride image of the occupant cabin is captured, as illustrated at block 106. The first post-ride image may be captured by the optical camera 26' based on a command from the controller 22. The command may be generated, for example, based on a determination that no occupants are currently in the vehicle 12. The first post-ride image has a first incident light configuration. In some embodiments, capturing the first post-ride image of the occupant cabin may include controlling the light control system 82 to replicate the predefined reference light setting. In such embodiments, the first incident light configuration therefore corresponds to the reference light setting. In other embodiments, the first incident light configuration corresponds to ambient light, e.g. from external light sources such as the sun or street lights. Based on light sources of the first incident light configuration, the object 84 will cast a first shadow 86 in the illustration of FIG. 4C.

An image difference between the first post-ride image and the reference image is determined, as illustrated at block 108. This may be performed by any suitable image difference algorithm.

A determination is made of whether the image difference indicates a potential object left behind in the cabin 80, as illustrated at operation 110. In an exemplary embodiment, a determination may be made that a potential object is left behind in response to the image difference between the first post-ride image and the reference image exceeding a threshold in a region of the occupant cabin 80. However, it may be difficult to ascertain, based on a two-dimensional image, whether the difference is due to an object left behind, or due to a stain or discoloration on upholstery or carpet in the cabin 80.

If the determination of operation 110 is negative, i.e. the image difference does not indicate a potential object, then the algorithm ends at block 124. The algorithm may then repeat for a subsequent drive cycle. In an exemplary embodiment, the first post-ride image may be re-used as a reference image for a subsequent drive cycle.

If the determination of operation 110 is positive, then one or more vehicle systems are controlled to change incident light orientation and/or intensity, as illustrated at block 112. A second incident light configuration, which is distinct from the first incident light configuration, is thereby generated. In an exemplary embodiment, the light control system 82 is controlled to change light orientation and/or intensity, e.g. by turning on or off interior lights, opening or closing a window or shade, or modifying opacity of one or more electrochromic windows. In another exemplary embodiment, vehicle actuators 30 are controlled by the ADS 24 to reposition the vehicle 12 in a different orientation relative to ambient light sources, and thereby change the orientation of incident light in the cabin 80. Based on light sources of the first incident light configuration, the object 84 will cast a second shadow 86' in the illustration of FIG. 4D.

A subsequent post-ride image of the occupant cabin is captured, as illustrated at block 114. The subsequent post-ride image may be captured by the optical camera 26' based on a command from the controller 22. An image difference between the subsequent post-ride image and the first post-ride image is determined, as illustrated at block 116. This may be performed by any suitable image difference algorithm.

Figure 4D:
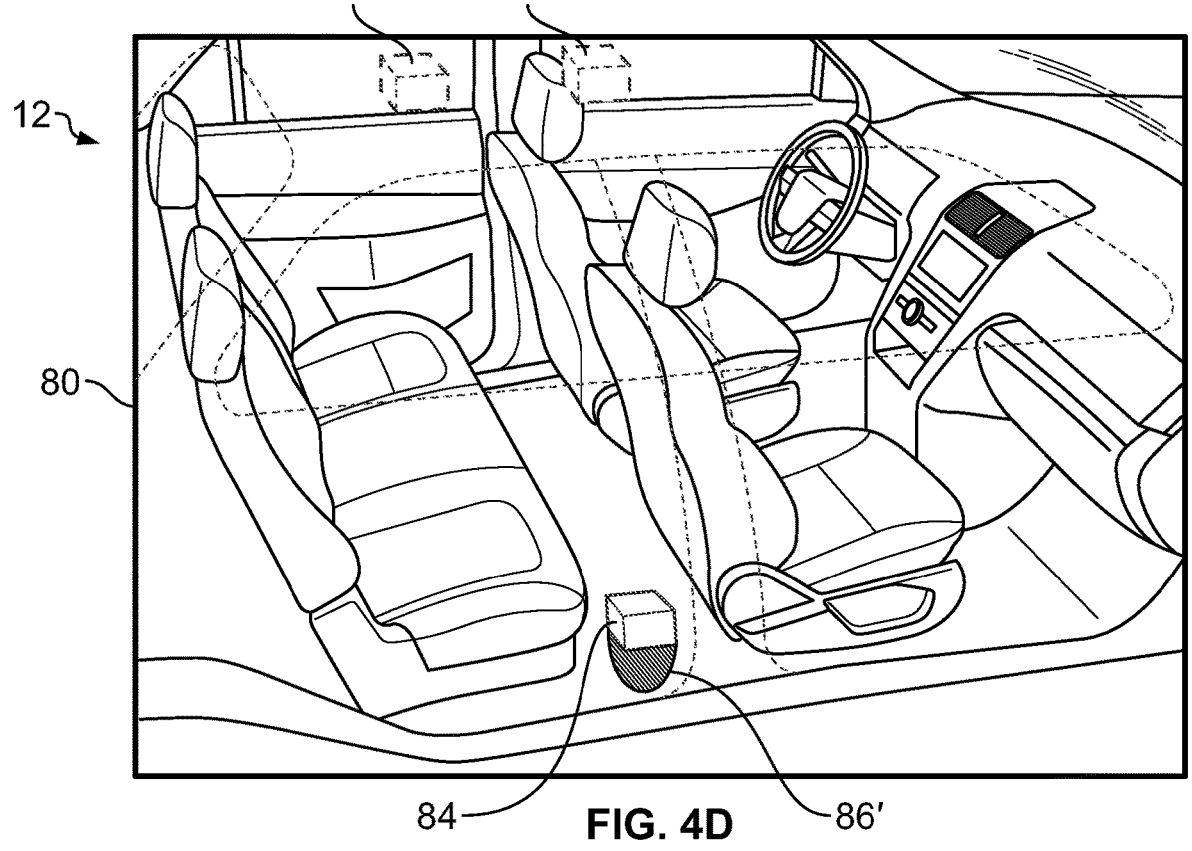

A determination is made of whether the image difference indicates an object left behind in the cabin 80, as illustrated at operation 118. In an exemplary embodiment, a determination may be made that an object is left behind in response to the image difference between the subsequent post-ride image and the first post-ride image exceeding a threshold. Such a difference based on the change in incident light is indicative of a three-dimensional object casting a shadow, as illustrated in FIG. 4D, rather than a stain or discoloration.

In response to the determination of operation 118 being negative, i.e. the image difference does not indicate an object, then the presence of a stain in the occupant cabin may be inferred and corrective action is taken, as illustrated at block 120. In an exemplary embodiment, this includes automatically controlling the vehicle 12, via the ADS 24, to a service facility for cleaning. Other corrective action may also be taken. The algorithm then terminates at block 124.

In response to the determination of operation 120 being positive, i.e. the image difference does indicate an object, then the presence of an object in the occupant cabin may be inferred and corrective action is taken, as illustrated at block 122. In an exemplary embodiment, this includes automatically communicating an alert to one or more recent passengers, e.g. by communicating a notification to the passenger's mobile device, honking a vehicle horn, flashing vehicle lights, or any other suitable means of communicating an alert. The algorithm then terminates at block 124.

Variations of the above are, of course, possible. As an example, one or more further post-ride images may be captured with other incident light configurations to provide additional precision about the location, shape, size, or other characteristics of objects left behind in the vehicle. As a further example, a size of the object may be calculated based on a length of the shadow cast by the object and knowledge of the location of the light source used to create the shadow. Moreover, similar methods to those discussed above may be implemented to detect objects in other detection spaces, e.g. in vehicle trunks, or indeed in non-automotive settings.

As may be seen the present disclosure provides a system and method for automatically determining that an object has been left behind in a vehicle, and for taking corrective action when such a determination is made.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An automotive vehicle comprising:
a cabin;
an optical sensor arranged to capture images of the cabin;
a light control system operable to modify an intensity or direction of incident light in the cabin; and
a controller configured to automatically, in response to an object detection request, control the optical sensor to capture a first image of the cabin with a first incident light configuration, control the light control system to modify an intensity or direction of incident light in the cabin to a second incident light configuration, control the optical sensor to capture a second image of the cabin with the second incident light configuration, detect a change in a shadow between the first image and the second image, infer a presence of an object in the cabin based on the change in the shadow, and perform a corrective action based on the presence of the object.

2. The vehicle of claim 1, wherein the light control system comprises an interior light disposed in the cabin, and wherein the controller is configured to control the light control system by selectively turning the interior light on or off.

3. The vehicle of claim 1, wherein the cabin is provided with at least one window, wherein the light control system comprises a window system operable to modify incident light through the at least one window, and wherein the controller is configured to control the light control system by selectively controlling the window system to modify the incident light.

4. The vehicle of claim 1, wherein the light control system comprises at least one actuator configured to control vehicle steering, acceleration, or braking, and wherein the controller is configured to control the light control system by selectively controlling the actuator to move the vehicle between a first orientation with respect to an ambient light source and a second orientation with respect to the ambient light source.

5. The vehicle of claim 1, wherein the object detection request is based on an image difference between a reference cabin image captured before a drive cycle and a post-cycle cabin image captured after the drive cycle.

6. The vehicle of claim 1, wherein the corrective action comprises signaling an alert to a user.

7. A method of detecting an object, comprising:
providing a detection space with an optical sensor arranged to capture images of the detection space, a light control system operable to modify an intensity or direction of incident light in the detection space, and at least one controller in communication with the optical sensor and the light control system;
automatically controlling the optical sensor, via the at least one controller, to capture a first image of the detection space with a first incident light configuration;
automatically controlling the light control system, via the at least one controller, to modify the intensity or direction of incident light in the detection space to a second incident light configuration, distinct from the first incident light configuration;
automatically controlling the optical sensor, via the at least one controller, to capture a second image of the detection space with the second incident light configuration;
automatically detecting a change in a shadow between the first image and the second image via the at least one controller;
automatically inferring, via the at least one controller, a presence of an object in the detection space based on the change in the shadow; and
automatically signaling an alert, via the at least one controller, based on the inferred presence of the object.

8. The method of claim 7, wherein the detection space is provided with at least one window, wherein the light control system comprises a window system operable to modify incident light through the window, and wherein the automatically controlling the light control system comprises controlling the window system to modify the incident light.

9. The method of claim 7, wherein the automatically detecting a change in shadow comprises performing an image difference algorithm on the first image and the second image.

10. The method of claim 7, wherein the light control system comprises an interior light disposed in the detection space, and wherein the automatically controlling the light control system comprises selectively turning the interior light on or off.

11. The method of claim 7, wherein the detection space comprises a cabin of an automotive vehicle.

12. The method of claim 11, wherein the light control system comprises at least one actuator configured to control vehicle steering, acceleration, or braking, and wherein the automatically controlling the light control system comprises selectively controlling the actuator to move the vehicle between a first orientation with respect to an ambient light source and a second orientation with respect to the ambient light source.

13. A detection system for an automotive vehicle comprising:
- an optical sensor arranged to capture images of a portion of the vehicle;
- a light control system operable to modify an intensity or direction of incident light on the portion of the vehicle; and
- a controller configured to control the optical sensor to capture a reference image of the portion of the vehicle prior to a drive cycle, control the optical sensor to capture a first image of the portion of the vehicle subsequent the drive cycle, control the light control system to modify the intensity or direction of incident light on the portion of the vehicle to a second incident light configuration in response to the first image differing from the reference image, control the optical sensor to capture a second image of the portion of the vehicle with the second incident light configuration, detect a change in a shadow between the first image and the second image, infer a presence of an object in the portion of the vehicle based on the change in the shadow, and automatically signal an alert in response to the inferred presence of the object.

* * * * *